Patented Feb. 13, 1923.

1,444,946

UNITED STATES PATENT OFFICE.

ARTHUR L. BROWN, OF WILKINSBURG, PENNSYLVANIA, ASSIGNOR TO WESTINGHOUSE ELECTRIC & MANUFACTURING COMPANY, A CORPORATION OF PENNSYLVANIA.

SOLDERING FLUX.

No Drawing. Application filed December 22, 1919. Serial No. 346,615.

*To all whom it may concern:*

Be it known that I, ARTHUR L. BROWN, a citizen of the United States, and a resident of Wilkinsburg, in the county of Allegheny and State of Pennsylvania, have invented a new and useful Improvement in Soldering Fluxes, of which the following is a specification.

My invention relates to soldering fluxes and it has, for its primary object, the provision of a soldering flux or paste which shall be non-corrosive in its action and, consequently, suitable for use even in the most delicate electrical work.

Heretofore, soldering fluxes commonly employed, have included as ingredients either a metallic chloride, such as zinc chloride, which is an acid salt, or rosin, which is also acid in its action, or both. By the practice of my invention, I replace metallic chloride and rosin, as commonly employed in fluxes, with a metallic resinate which is neutral in its action.

Rosin contains a high percentage of abietic acid and is, therefore, injurious in soldering fluxes as it causes them to exert a corrosive action upon the metals with which they are employed. In making a metallic resinate from rosin, such as zinc resinate, this acid is substantially eliminated by the formation of a salt of the acid with the metal used. In other words, a metallic soap is formed which is soluble in tallow and many other fats or fatty oils in the same manner as ordinary soap is soluble in water.

While many metallic resinates are suitable for the purpose, I have found that the precipitated zinc resinate commercially available, is very well suited for the purpose. However, my invention comprises the employment of any metallic resinate which is soluble in the tallow or other fat or fatty oils forming an ingredient of the flux.

Obviously, numerous soldering fluxes of various compositions may be provided by substituting a metallic resinate of suitable character for the rosin or metallic chloride, or both, of soldering fluxes now in use. I have found, however, that a soldering flux of the following composition is non-corrosive, flows easily and smoothly and is highly satisfactory:

5 parts by weight of zinc resinate (precipitated).

15 parts by weight of mutton tallow (acidless).

1 part by weight of ammonium chloride (commercially pure).

10 to 15 parts by weight of glycerine (commercially pure).

When making a soldering flux according to the foregoing formula, I may preferably dissolve the zinc or other metallic resinate in the mutton tallow by heating them to approximately 130° C., and I may dissolve the ammonium chloride in the glycerine by heating them to not over 100° C. The mixture of the resinate and tallow should then be cooled to approximately the temperature of the second mixture, that is, to substantially 100° C., after which the second mixture should be slowly poured into the first, with constant stirring. This stirring should be continued until the entire mixture has reached a temperature of about 40° C., when it should be poured into suitable tight containers, such as small tin cans or boxes.

While I have specified mutton tallow as the fat employed, this may be replaced, in whole or in part, by other fats or fatty oils, such as olive oil, cotton seed oil, and the like, and, in part, by petrolatum. For example, I may heat 7½ parts, by weight, of mutton tallow with 5 parts, by weight, of a zinc or other metallic resinate, to 130° C., until solution of the resinate is complete and I may then add approximately 7½ parts, by weight, of petrolatum. This mixture of tallow, petrolatum and metallic resinate may then be combined with a mixture of one part, by weight, of ammonium chloride and 10 to 15 parts, by weight, of glycerine to form a soldering flux greatly similar to that previously described but of slightly smoother structure.

From the foregoing description, it will be clear that my invention broadly comprehends the employment of a metallic resinate in a soldering flux in place of previously-considered-necessary ingredients of an acid character. As this principle is applicable to the manufacture of a wide range of soldering fluxes, containing numerous other ingredients, it will be understood that no limitations are to be imposed upon my invention, other than those necessitated by the prior art or pointed out in the claims.

I claim as my invention:

1. A soldering flux including a metallic resinate as an ingredient thereof.

2. A soldering flux including, as ingredients, ammonium chloride, a fat and a metallic resinate soluble in the fat.

3. A soldering flux including, as ingredients, ammonium chloride, a fat and zinc resinate.

4. A soldering flux including, as ingredients, ammonium chloride, a tallow and a metallic resinate soluble in the tallow.

5. A soldering flux including as ingredients, ammonium chloride, tallow and zinc resinate.

6. A soldering flux comprising ammonium chloride, tallow, a metallic resinate soluble in the tallow and glycerine.

7. A soldering flux comprising ammonium chloride, tallow, petrolatum, a metallic resinate soluble in the tallow, and glycerine.

8. A soldering flux comprising ammonium chloride, tallow, petrolatum, zinc resinate and glycerine.

9. A soldering flux including, as ingredients, a metallic resinate in solution in a fat.

10. A soldering flux comprising the following ingredients in substantially the proportions specified: 5 parts by weight of precipitated zinc resinate, 15 parts by weight of fat, 1 part by weight of ammonium chloride, 10 to 15 parts by weight of glycerine.

11. The method of forming a soldering flux which comprises dissolving a metallic resinate in a fat, dissolving ammonium chloride in glycerine and combining the solutions.

12. The method of forming a soldering flux which comprises dissolving zinc resinate in tallow, dissolving ammonium chloride in glycerine, slowly stirring the ammonium-chloride solution into the zinc-resinate solution and continuing the stirring during the first part of the cooling of the mixture.

In testimony whereof, I have hereunto subscribed my name this 30th day of Oct. 1919.

ARTHUR L. BROWN.